US012121919B1

(12) United States Patent
Min

(10) Patent No.: US 12,121,919 B1
(45) Date of Patent: Oct. 22, 2024

(54) SPRING AND PUMPING-TYPE CONTAINER INCLUDING SAME

(71) Applicant: Byung Sun Min, Bucheon-si (KR)

(72) Inventor: Byung Sun Min, Bucheon-si (KR)

( * ) Notice: Subject to any disclaimer, the term of this patent is extended or adjusted under 35 U.S.C. 154(b) by 0 days.

(21) Appl. No.: 18/615,764

(22) Filed: Mar. 25, 2024

(30) Foreign Application Priority Data

Nov. 10, 2023 (KR) ........................ 10-2023-0155166

(51) Int. Cl.
*B05B 11/00* (2023.01)
*B05B 11/10* (2023.01)

(52) U.S. Cl.
CPC ...... *B05B 11/1069* (2023.01); *B05B 11/1047* (2023.01); *B05B 11/1077* (2023.01)

(58) Field of Classification Search
CPC ............. B05B 11/1069; B05B 11/1047; B05B 11/1077
See application file for complete search history.

(56) References Cited

U.S. PATENT DOCUMENTS 3,452,905 A * 7/1969 Micallef ................... F04B 9/14 222/207
5,518,147 A * 5/1996 Peterson ............. B05B 11/1097 222/153.07
10,010,896 B2 * 7/2018 Kraus ................. B05B 11/1001
10,898,916 B1 * 1/2021 Rossignol ............... F04B 53/06
2017/0246648 A1 * 8/2017 Rossignol ............. A45D 34/00

FOREIGN PATENT DOCUMENTS

| | | | |
|---|---|---|---|
| JP | 2005-238214 | A | 9/2005 |
| KR | 20-2014-0006232 | U | 12/2014 |
| KR | 10-2292287 | B1 | 8/2021 |
| KR | 10-2021-0124889 | A | 10/2021 |
| KR | 10-2382012 | B1 | 4/2022 |

OTHER PUBLICATIONS

Office Action dated Jan. 13, 2024 for corresponding Korean Patent Application No. 10-2023-0155166, along with English machine translation (10 pages).
Applicant Opinion for corresponding Korean Patent Application No. 10-2023-0155166, along with English machine translation (18 pages).

* cited by examiner

*Primary Examiner* — Vishal Pancholi
(74) *Attorney, Agent, or Firm* — Hauptman Ham, LLP

(57) ABSTRACT

A spring includes a first support tube part having a circular tube shape, a second support tube part disposed so that the center line thereof is aligned with the center line of the first support tube part, and an elastic deformation part, the outer surface of which includes an area connected to the upper end of the second support tube part and having an outward convex shape and the inner surface of which includes an area connected to the lower end of the first support tube part and having an inward convex shape, the elastic deformation part including a deformation-guiding groove formed to have a downward concave shape on the outer surface of the area connected to the lower end of the first support tube part.

4 Claims, 10 Drawing Sheets

SPRING AND PUMPING-TYPE CONTAINER INCLUDING SAME

CROSS-REFERENCE TO RELATED APPLICATION(S)

This application is based upon and claims the benefit of priority from Korean Patent Application No. 10-2023-0155166, filed on Nov. 10, 2023 in the Korean Intellectual Property Office, the entire contents of which is incorporated herein by reference.

BACKGROUND OF THE INVENTION

1. Field of the Invention

The present disclosure relates to a pumping-type container having a structure in which a liquid content stored in a container part is gradually discharged to the outside in a pumping manner by pressing manipulation of a button, and a spring used therein.

2. Description of the Prior Art

A pumping-type container having a structure in which a liquid content, such as a cosmetic, is discharged in a pumping manner by a pressing manipulation of a button is being used. A spring, which accumulates an elastic force for raising the button to the original position thereof when the button is pressed downward, is installed in a pumping-type container.

FIG. 9 is an assembled cross-sectional view of a conventional pumping-type container, and FIG. 10 is an exploded cross-sectional view of the conventional pumping-type container.

A conventional pumping-type container includes a container part 110, a cylinder 120 installed inside the container part 110, a button 130 having a button discharge channel 131*a* and installed above the container part 110, a container cap 153 coupled to the container part 110 to surround the button 130, a shoulder part 140 connected to the container part 110, and a pumping part 160 operating in cooperation with the upward or downward operation of the button 130 to discharge a liquid content stored in the container part 110 to the outside through the cylinder 120 and the button discharge channel 131*a*.

The cylinder 120 has a bottom surface having an inlet hole 121*a* formed through the center thereof.

The pumping part 160 includes a cylinder piston 161 installed to be in close contact with the inner surface of the cylinder 120, a pressing member 162 installed between the cylinder 120 and the button 130, an opening/closing operation shaft 163 which is installed between the cylinder 120 and the button 130 and has a lower end extending through the cylinder piston 161, a cylinder valve 164 installed on the bottom surface of the cylinder 120 to seal the inlet hole 121*a*, and a spring 170 installed between the cylinder 120 and the button 130 to surround the pressing member 162.

The spring 170 includes a circular ring-shaped upper support plate 171, a circular ring-shaped lower support plate 172 disposed below the upper support plate 171, and an elastic deformation part 173 connecting the lower surface of the upper support plate 171 and the upper surface of the lower support plate 172.

The elastic deformation part 173 is formed in a triple helix form.

The spring 170 is installed so that the upper support plate 171 is supported by the pressing member 162 and the lower support plate 172 is supported by the shoulder part 140.

When the button 130 is pressed to be lowered toward a container bottom surface part 111, an elastic force is accumulated in the spring 170 while the elastic deformation part 173 is compressed.

However, in case of the conventional spring 170, since the elastic deformation part 173 is formed in a helix shape, when the elastic deformation part 173 is compressed by the operation in which the button 130 is pressed, there is a problem that there is a risk that a force attempting to rotate the button 130 along the circumferential direction of the upper support plate 171 is transmitted from the elastic deformation part 173 to the button 130 by means of the upper support plate 171. In case that the force attempting to rotate the upper support plate 171 along the circumferential direction is transmitted to the button 130, it becomes uncomfortable to press the button 130.

In addition, since the elastic deformation part 173 is formed in a helix shape, there are problems that the spring 170 has a complicated structure, and the size and the direction of an elastic force stored in the elastic deformation part 173 vary according to the pressing position and the pressing direction of the button 130. In case that the size and the direction of the elastic force stored in the elastic deformation part 173 vary, it becomes difficult to stably maintain the pumping operation of the pumping part 160.

SUMMARY OF THE INVENTION

The present disclosure is to provide a spring which can prevent a button from rotating, has a simple structure, and can stably maintain a deformation operation of an elastic deformation part, and a pumping-type container including same.

In view of the foregoing, the present disclosure provides a spring including a first support tube part having a circular tube shape, a second support tube part formed to have an inner diameter larger than an outer diameter of the first support tube part and disposed so that the center line thereof is aligned with the center line of the first support tube part, and an elastic deformation part, the outer surface of which includes an area connected to the upper end of the second support tube part and having an outward convex shape and the inner surface of which includes an area connected to the lower end of the first support tube part and having an inward convex shape, the elastic deformation part including a deformation-guiding groove formed to have a downward concave shape on the outer surface of the area connected to the lower end of the first support tube part, so as to guide bending deformation occurring in the area connected to the lower end of the first support tube part when the first support tube part is pressed toward the second support tube part.

In comparison with a conventional spring having a helix-shaped elastic deformation part, a spring according to the present disclosure can have a simplified structure and prevent a button from rotating, and enables stable deformation of the elastic deformation part by the deformation-guiding groove in which the deformation occurs.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
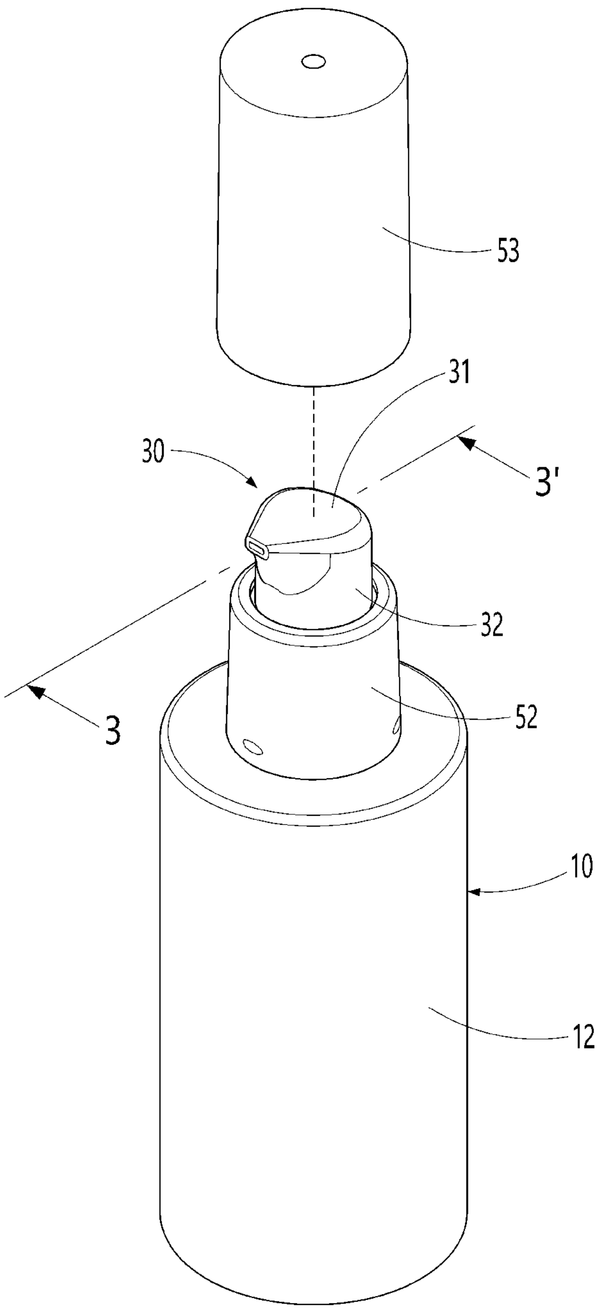
FIG. 1 and FIG. 2 are exploded perspective views of a pumping-type container according to an embodiment of the present disclosure.
Figure 2:
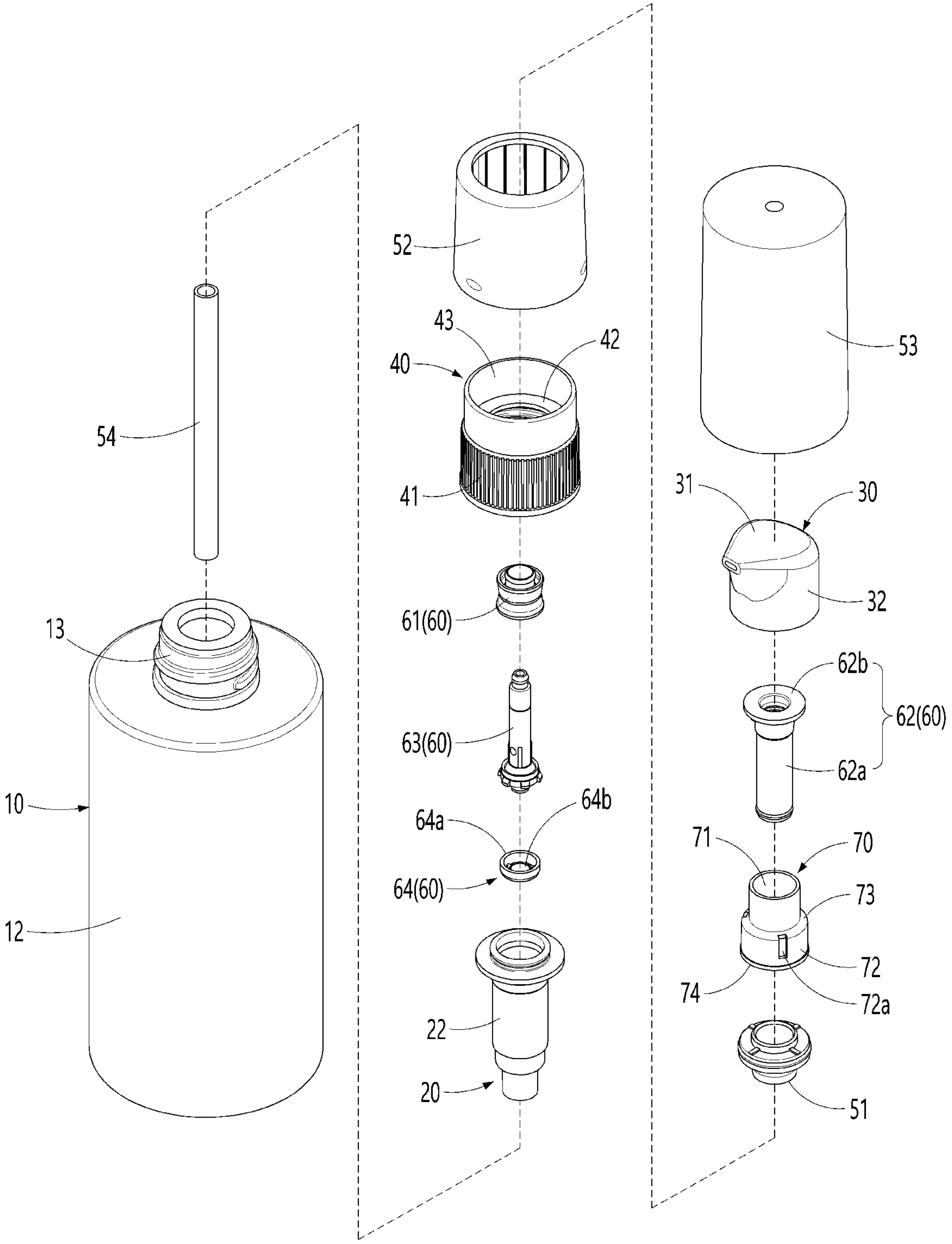
Figure 3:
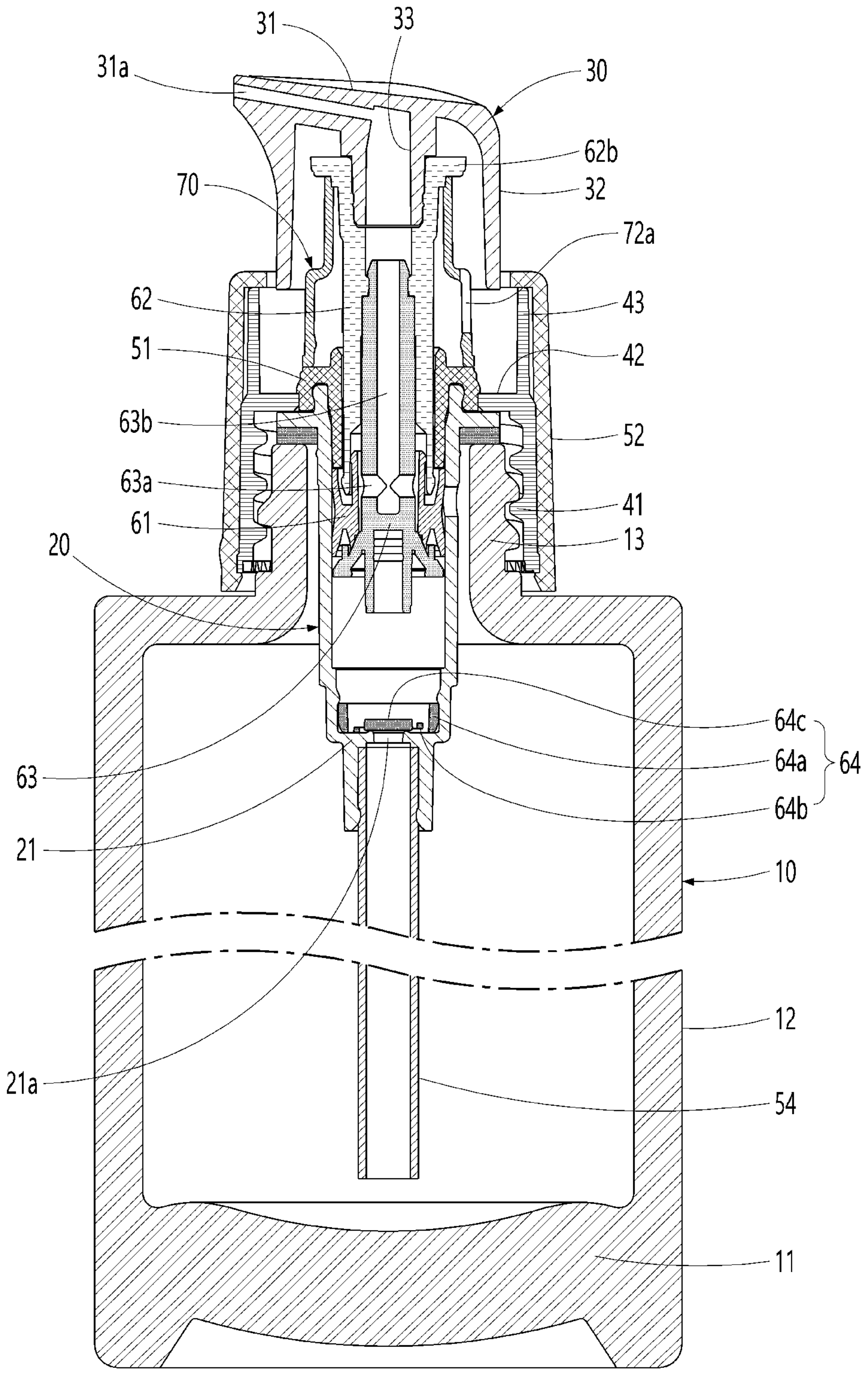
FIG. 3 is a cross-sectional view taken along line 3-3' in FIG. 1.
Figure 4:
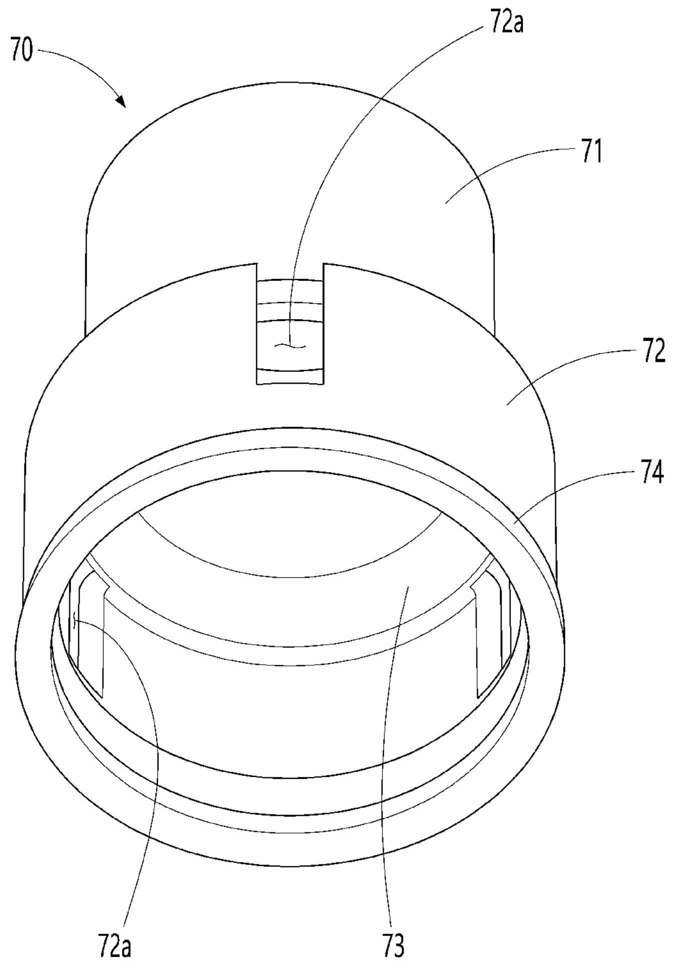
FIG. 4 and FIG. 5 are views showing a spring according to an embodiment of the present disclosure.

Hereinafter, the present disclosure will be described in detail with reference to the accompanying drawings.

A pumping-type container according to an embodiment of the present disclosure includes a container part 10, a cylinder 20 installed inside the container part 10, a discharge guide tube 54 coupled to the cylinder 20, a button 30 having a button discharge channel 31*a* and installed above the container part 10, a shoulder part 40 connected to the container part 10, a spring support member 51 installed between the cylinder 20 and the button 30, a protective cap 52 installed to surround the shoulder part 40, a container cap 53 coupled to the protective cap 52 to surround the button 30, and a pumping part 60 operating in cooperation with an upward or downward operation of the button 30 to discharge a liquid content stored in the container part 10 to the outside through the cylinder 20 and the button discharge channel 31*a*.

The container part 10 includes a container bottom surface part 11, a tube-shaped container side part 12 extending upward from the circumferential surface part of the container bottom surface part 11, and a container neck part 13 extending from container side part 12.

The cylinder 20 includes a cylinder bottom surface part 21 having an inlet hole 21*a* formed in the center thereof, and a straight tube-shaped cylinder side part 22 extending upward from the circumferential surface part of the cylinder bottom surface part 21.

The discharge guide tube 54 is coupled to the cylinder 20 to be connected to the inlet hole 21*a*.

The button 30 includes a button ceiling surface part 31 having a button discharge channel 31*a* formed therein, and a button side part 32 extending downward from the circumferential surface part of the button ceiling surface part 31.

The shoulder part 40 includes a shoulder fastening tube part 41, a shoulder support flange 42 extending inward from the upper end of the shoulder fastening tube part 41, and a cap support tube part 43 extending upward from the upper end of the shoulder fastening tube part 41.

The shoulder part 40 is coupled to the container neck part 13 through the shoulder fastening tube part 41.

The spring support member 51 is coupled to the upper end of the cylinder side part 22.

The protective cap 52 is installed to be supported by the upper end of the cap support tube part 43.

The pumping part 60 includes a cylinder piston 61 installed to be in close contact with the inner surface of the cylinder 20, a pressing member 62 installed between the cylinder 20 and the button 30, an opening/closing operation shaft 63 which is installed between the cylinder 20 and the button 30 and has a lower end extending through the cylinder piston 61, a cylinder valve 64 installed on the cylinder bottom surface part 21, and a spring 70 installed between the button 30 and the container part 10 to surround the pressing member 62.

The pressing member 62 includes a piston pressing tube part 62*a* and a spring support flange 62*b* extending outward from the upper end of the piston pressing tube part 62*a*.

The pressing member 62 is coupled to the button 30 so that the lower end of the piston pressing tube part 62*a* can press the cylinder piston 61 when the button 30 is lowered.

The opening/closing operation shaft 63 has an operation shaft communication hole 63*a* formed thereat and an operation shaft communication channel 63*b* formed therethrough.

The opening/closing operation shaft 63 is coupled to the piston pressing tube part 62*a* so as to move up or down together with the pressing member 62.

The cylinder valve 64 includes a tube-shaped valve body part 64*a*, a valve support arm 64*b*, and a sealing plate part 64*c* connected to the valve body part 64*a* by means of the valve support arm 64*b*.

The cylinder valve 64 is installed so that the sealing plate part 64*c* seals the inlet hole 21*a*.

The spring 70 includes a first support tube part 71 having a circular tube shape, a second support tube part 72 disposed so that the center line thereof is aligned with the center line of the first support tube part 71, an elastic deformation part 73 connecting the lower end of the first support tube part 71 and the upper end of the second support tube part 72, and a support protrusion 74 formed on the lower end of the outer surface of the second support tube part 72.

The first support tube part 71 has an inner diameter larger than the outer diameter of the pressing member 62.

The second support tube part 72 has an inner diameter larger than the outer diameter of the first support tube part 71.

The second support tube part 72 has three deformation-assisting grooves 72*a* formed on an area connected to and extending downward from the elastic deformation part 73.

The deformation-assisting grooves 72*a* are spaced apart from each other at equal intervals.

Each of the deformation-assisting grooves 72*a* is disposed in a straight line along the longitudinal direction of the first support tube part 71.

The outer surface of the elastic deformation part 73 includes an area connected to the upper end of the second support tube part 72 and having an outward convex shape, and the inner surface of the elastic deformation part includes an area connected to the lower end of the first support tube part 71 and having an inward convex shape, and the elastic deformation part 73 connects the lower end of the first support tube part 71 and the upper end of the second support tube part 72 to each other.

In addition, the elastic deformation part 73 has a deformation-guiding groove 73*b* formed on the outer surface of the area connected to the lower end of the first support tube part 71.

The deformation-guiding groove 73*b* is formed in a downward concave shape.

Figure 5:
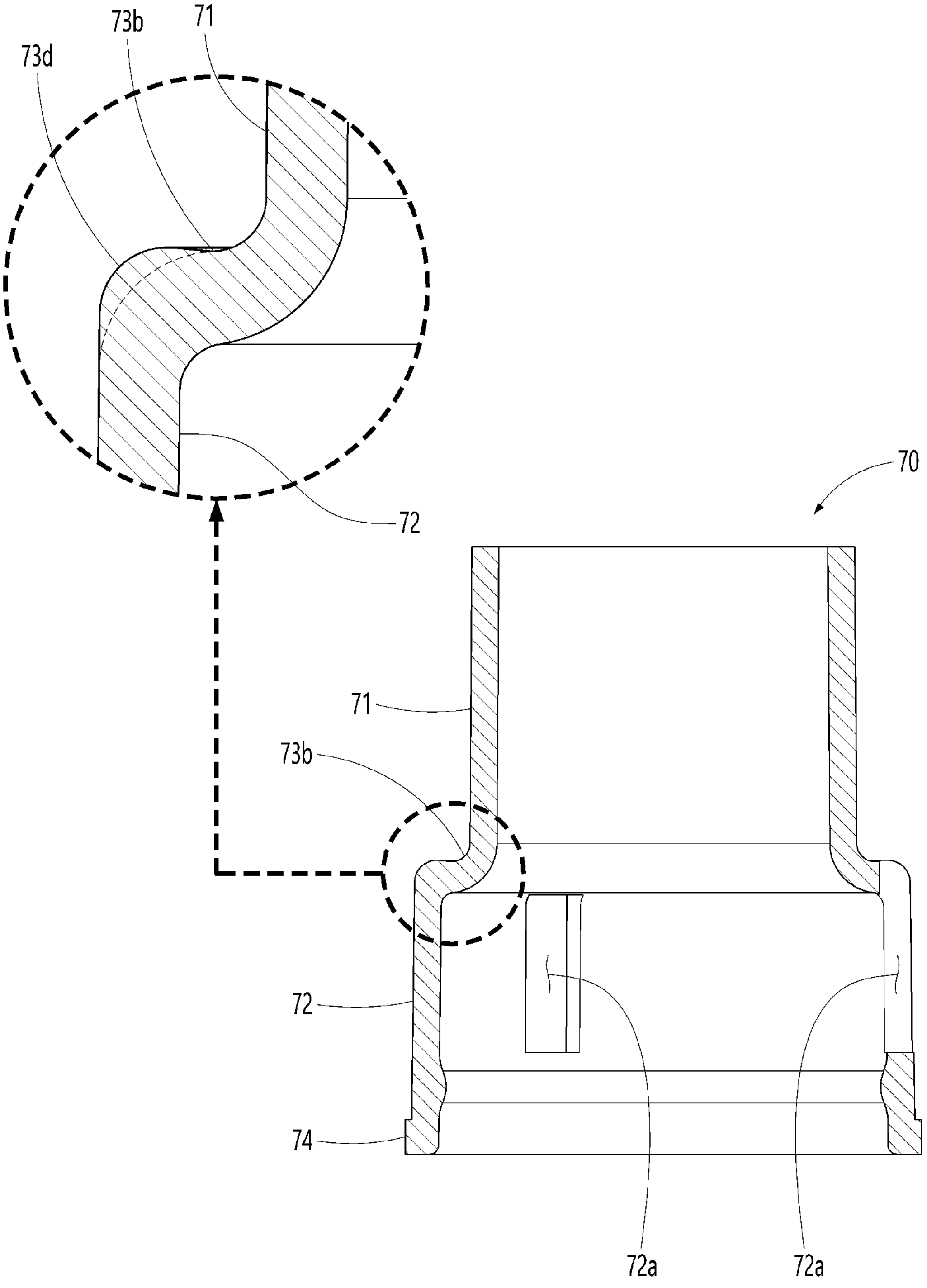
Figure 6:
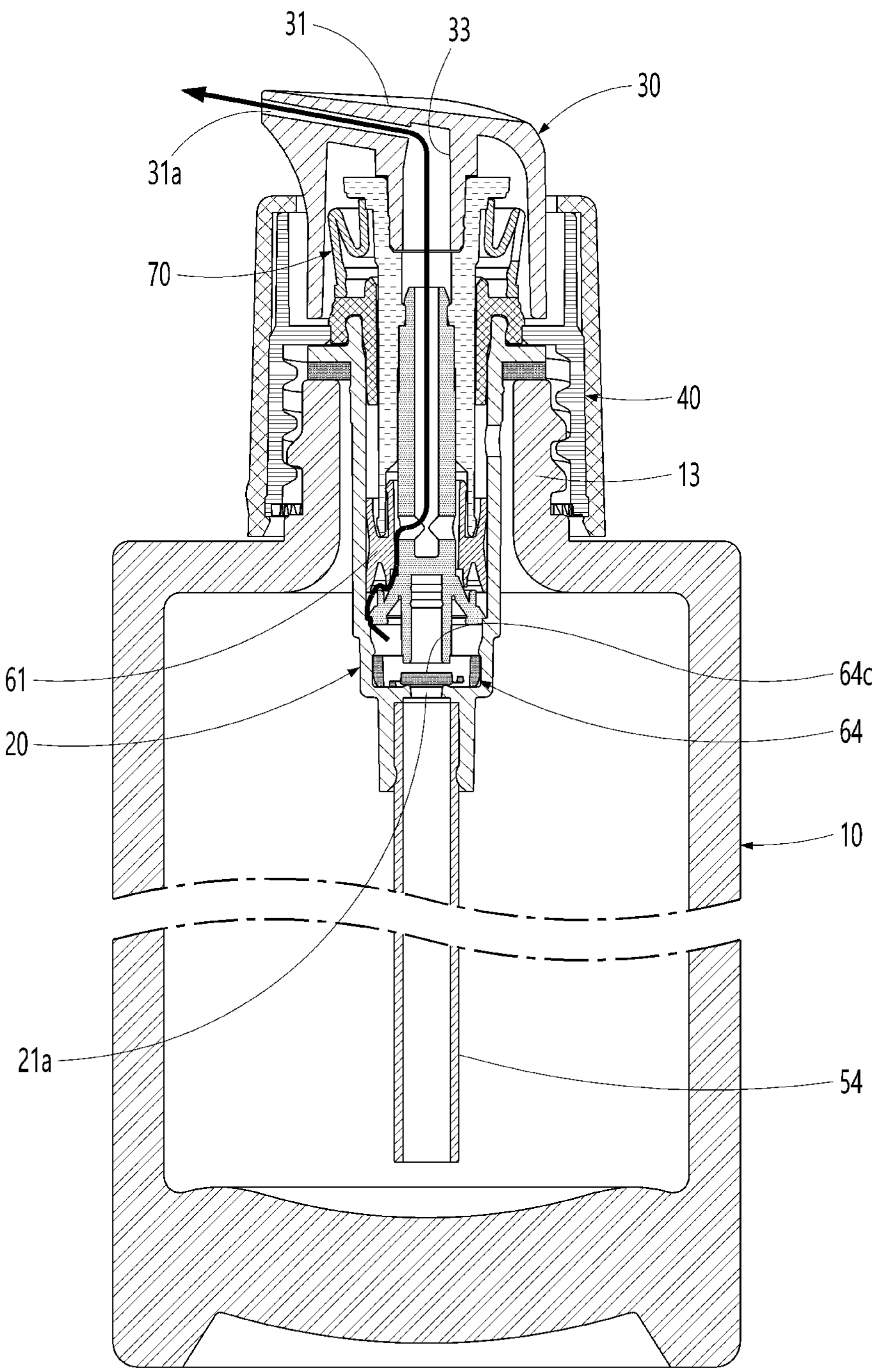
FIG. 6 is a view showing an operation state of a pumping-type container according to an embodiment of the present disclosure.

The deformation-guiding groove 73*b* is formed by relatively increasing the thickness of an area (see '73*d*' in FIG. 5), which is adjacent to the deformation-guiding groove 73*b*, of the elastic deformation part 73, by cutting the outer surface of the area connected to the lower end of the first support tube part 72, or the like.

When the first support tube part 71 is pressed toward the second support tube part 72, the deformation-guiding groove 73*b* functions to guide the bending deformation occurring in the area connected to the lower end of the first support tube part 71.

The support protrusion 74 functions to stably maintain a state in which the spring 70 is supported.

The spring 70 is installed so that the upper end of the first support tube part 71 is supported by the spring support flange 62*b*, and the lower end of the second support tube part 72 is supported by the spring support member 51.

The spring 70 is made of rubber or thermoplastic elastomer such as thermoplastic polyether elastomer (TPE) or thermoplastic polyether ester elastomer (TPEE).

Hereinafter, an operation of the pumping part 60 is described.

When the button 30 is pressed toward the container bottom surface part 11, the button 30, the pressing member 62, the opening/closing operation shaft 63, the and cylinder piston 61 moves downward. At this time, since the cylinder piston 61 begins to descend after the opening/closing operation shaft 63 descends, the space between the opening/closing operation shaft 63 and the cylinder piston 61 is opened.

While button 30 is being lowered, deformation occurs in the elastic deformation part 73, the first support tube part 71, and the second support tube part 72 so that an elastic force is accumulated in the spring 70.

In the elastic deformation part 73, bending deformation occurs in the deformation-guiding groove 73*b*.

The amount of bending deformation in the elastic deformation part 73 and the amount of deformation in the second support tube part 72 increase due to the deformation-assisting groove 72*a*.

When the cylinder piston 61 is lowered, the inlet hole 21*a* is sealed by the cylinder valve 64, and the liquid content stored in the cylinder 20 is discharged to the outside through the operation shaft communication hole 63*a*, the operation shaft communication channel 63*b*, and the button discharge channel 31*a*.

When the operation of pressing the button 30 is stopped, the button 30, the pressing member 62, the opening/closing operation shaft 63, and the cylinder piston 61 is raised by the elastic force accumulated in the spring 70. At this time, since the cylinder piston 61 begins to ascend after the opening/closing operation shaft 63 ascends, the space between the opening/closing operation shaft 63 and the cylinder piston 61 is closed.

When the cylinder piston 61 is raised, the inlet hole 21*a* is opened, and thus the liquid content stored in the container part 10 flows into the cylinder 20 through the discharge guide tube 54 and the inlet hole 21*a*.

Figure 7:
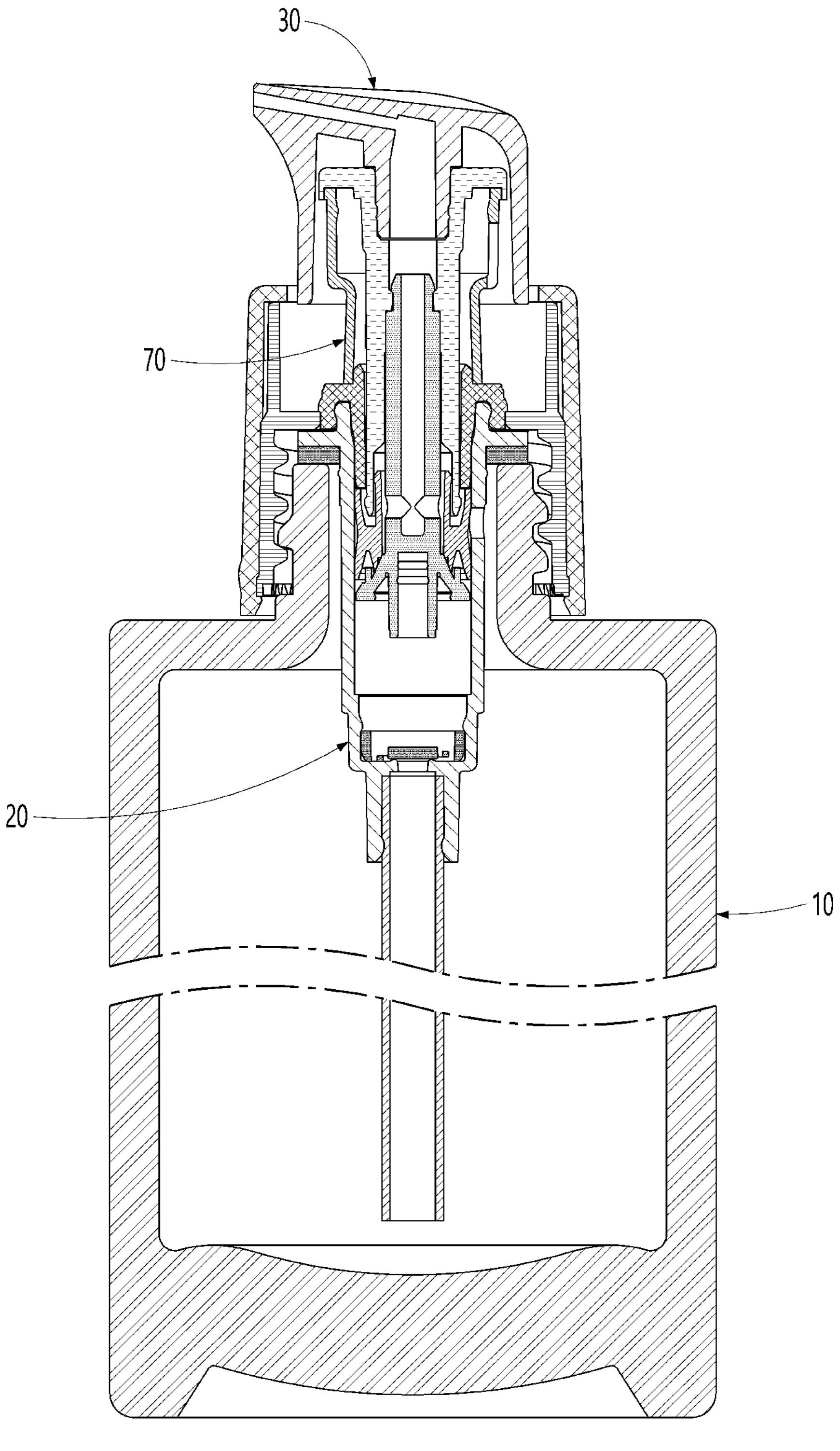
FIG. 7 is a cross-sectional view showing a state in which a spring is installed upside down according to an embodiment of the present disclosure.

Meanwhile, although the spring 70 is installed such that the first support tube part 71 is disposed at an upper side and the second support tube part 72 is disposed at a lower side in the above-described embodiment, the present disclosure can be implemented by a configuration as illustrated in FIG. 7 in which the spring 70 is installed such that the first support tube part 71 is disposed at a lower side and the second support tube part 72 is disposed at an upper side.

Figure 8:
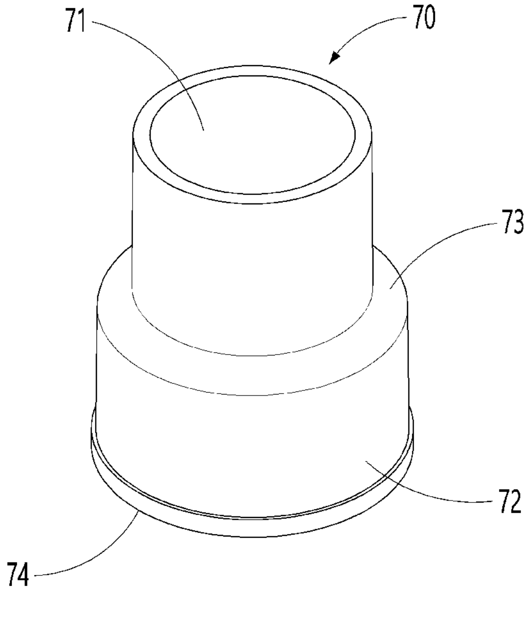
FIG. 8 is a perspective view of a spring according to another embodiment of the present disclosure.
Figure 9:
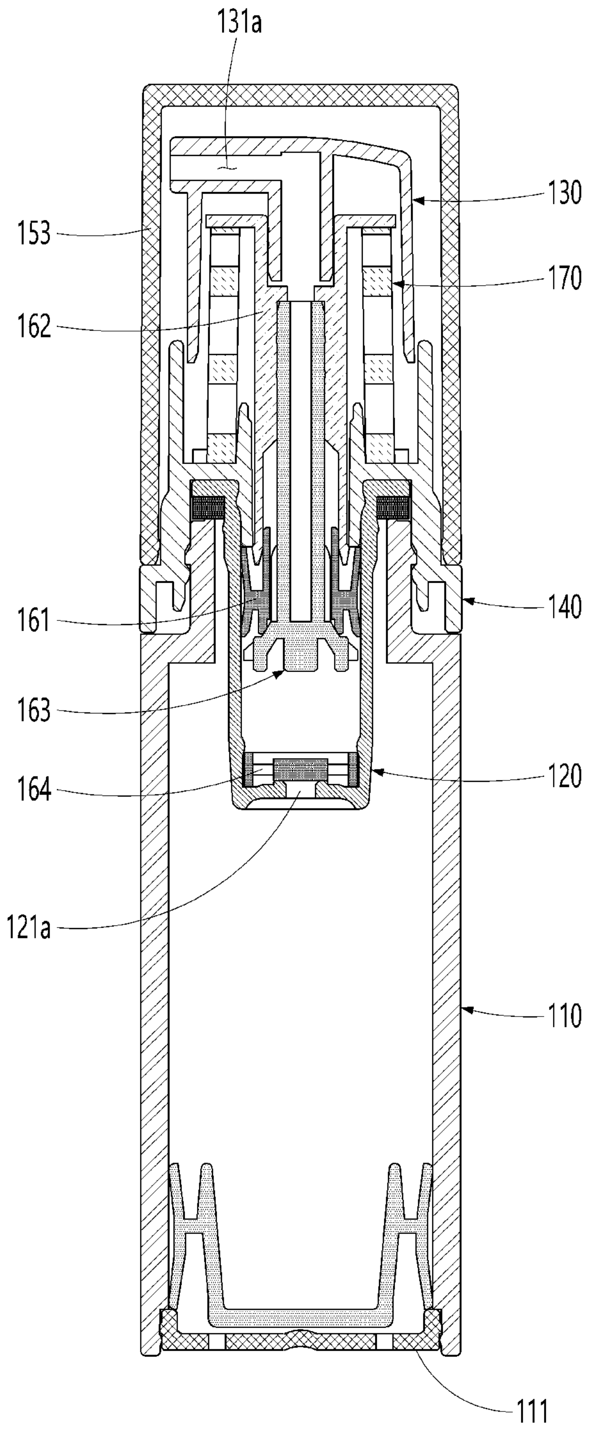
FIG. 9 PRIOR ART
FIG. 9 is an assembled cross-sectional view of a conventional pumping-type container.
Figure 10:
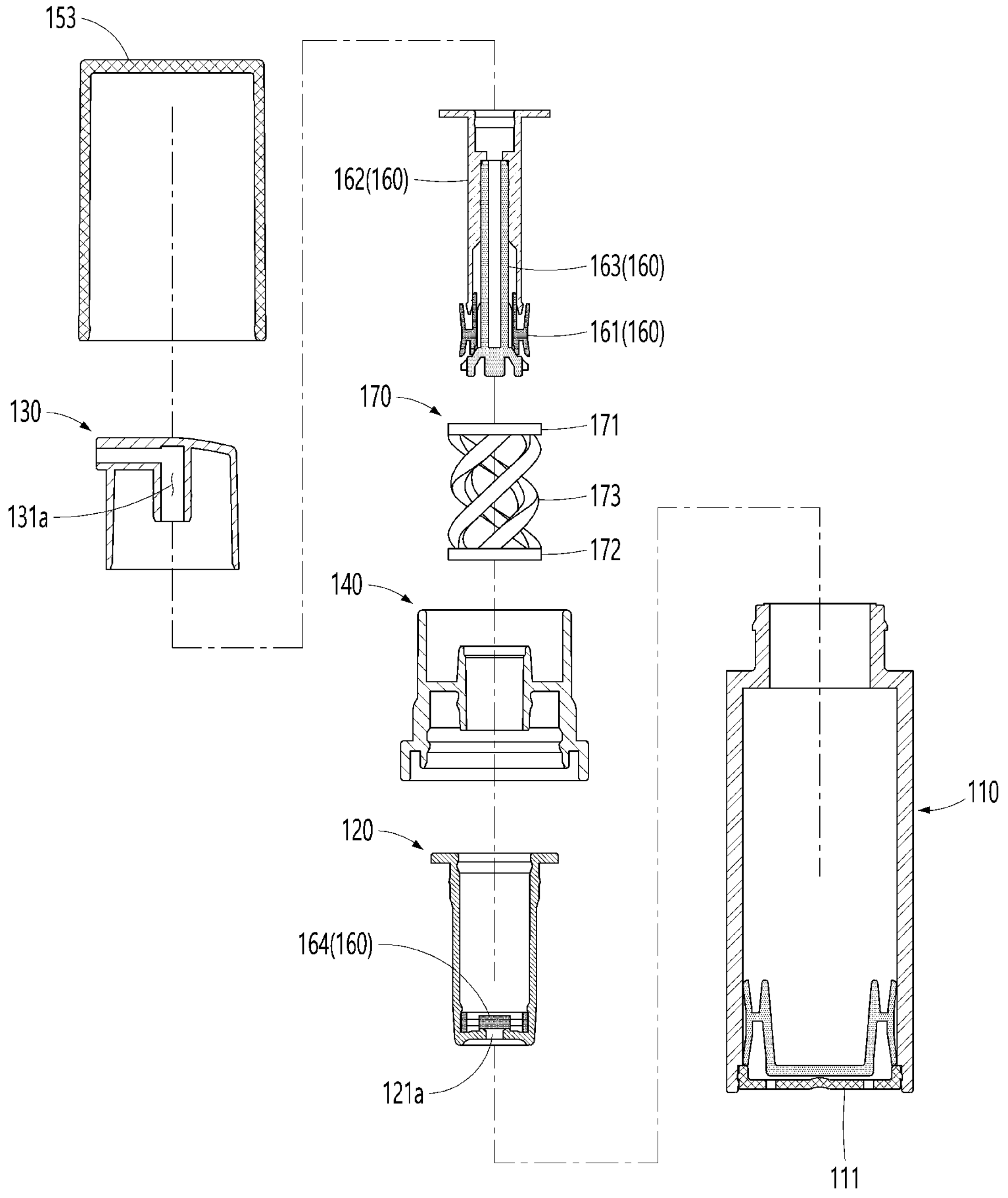
FIG. 10 PRIOR ART
FIG. 10 is an exploded cross-sectional view of a conventional pumping-type container.

In addition, although a deformation-assisting groove 72*a* is formed in the second support tube part 72 in the above-described embodiment, the present disclosure can be carried out without the deformation-assisting groove 72*a* formed in the second support tube part 72 as illustrated in FIG. 8.

As described above, according to embodiments of the present disclosure, the spring is configured to include the first support tube part 71 having a circular tube shape, a second support tube part 72 disposed so that the center line thereof is aligned with the center line of the first support tube part 71, and an elastic deformation part 73 having the outer surface of the area connected to the upper end of the second support tube part 72 and the inner surface of the area connected to the lower end of the first support tube part 71, the outer surface being formed in an outward convex shape, the inner surface being formed in an inward convex shape, and having the deformation-guiding groove 73*b* formed on the outer surface of the area connected to the lower end of the first support tube part 71. Therefore, according to the present disclosure, compared to a conventional spring having a helix-shaped elastic deformation part, the structure of the spring can be simplified, the button 30 can be prevented from rotating, and the deformation-guiding groove in which the deformation occurs enables stable deformation of the elastic deformation part 73.

In addition, the deformation operation of the elastic deformation part 73 can be stably maintained compared to a spring having the structure in which the deformation-guiding groove 73*b* is not formed on the elastic deformation part 73.

In addition, the deformation-assisting groove 72*a* is formed in the second support tube part 72 so that the bending deformation amount in the elastic deformation part 73 and the deformation amount in the second support tube part 72 can be increased.

What is claimed is:

1. A spring comprising:

a first support tube part having a circular tube shape;

a second support tube part formed to have an inner diameter larger than an outer diameter of the first support tube part and disposed so that the center line thereof is aligned with the center line of the first support tube part; and an elastic deformation part configured to connect the lower end of the first support tube part and the upper end of the second support tube part, wherein the outer surface of the elastic deformation part includes an area connected to the upper end of the second support tube part and having an outward convex shape and the inner surface of the elastic deformation part includes an area connected to the lower end of the first support tube part and having an inward convex shape, and wherein the elastic deformation part comprises a deformation-guiding groove formed to have a downward concave shape on the outer surface of the area connected to the lower end of the first support tube part, so as to guide bending deformation occurring in the area connected to the lower end of the first support tube part when the first support tube part is pressed toward the second support tube part.

2. The spring of claim 1, wherein the second support tube part comprises multiple deformation-assisting grooves formed on an area connected to and extending downward from the elastic deformation part, spaced apart from each other at equal intervals, and arranged in a straight line along the longitudinal direction of the first support tube part.

3. A pumping-type container comprising:

a container part in which a liquid content is stored;

a button having a button discharge channel and installed above the container part; and a pumping part which comprises a spring installed between the button and the container part to accumulate an elastic force for raising the button to the original position thereof when the button is pressed to be lowered toward the container part, and is configured to operate cooperation with an upward or downward operation of the button so as to discharge a liquid content stored in the container part to the outside through the button discharge channel, wherein the spring includes:

a first support tube part having a circular tube shape;

a second support tube part formed to have an inner diameter larger than an outer diameter of the first support tube part and disposed so that the center line thereof is aligned with the center line of the first support tube part; and an elastic deformation part configured to connect the lower end of the first support tube part and the upper end of the second support tube part, wherein the outer surface of the elastic deformation part includes an area connected to the upper end of the second support tube part and having an outward convex shape and the inner surface of the clastic deformation part includes an area connected to the lower end of the first support tube part and having an inward convex shape, and wherein the elastic deformation part comprises a deformation-guiding groove formed to have a downward concave shape on the outer surface of the area connected to the lower end of the first support tube part, so as to guide bending deformation occurring in the area connected to the lower end of the first support tube part when the first support tube part is pressed toward the second support tube part.

4. A pumping-type container comprising:

a container part in which a liquid content is stored;

a button having a button discharge channel and installed above the container part; and a pumping part which comprises a spring installed between the button and the container part to accumulate an elastic force for raising the button to the original position thereof when the button is pressed to be lowered toward the container part, and is configured to operate cooperation with an upward or downward operation of the button so as to discharge a liquid content stored in the container part to the outside through the button discharge channel, wherein the spring includes:

a first support tube part having a circular tube shape;

a second support tube part formed to have an inner diameter larger than an outer diameter of the first support tube part and disposed so that the center line thereof is aligned with the center line of the first support tube part; and an elastic deformation part configured to connect the lower end of the first support tube part and the upper end of the second support tube part, wherein the outer surface of the elastic deformation part includes an area connected to the upper end of the second support tube part and having an outward convex shape and the inner surface of the elastic deformation part includes an area connected to the lower end of the first support tube part and having an inward convex shape, wherein the elastic deformation part comprises a deformation-guiding groove formed to have a downward concave shape on the outer surface of the area connected to the lower end of the first support tube part, so as to guide bending deformation occurring in the area connected to the lower end of the first support tube part when the first support tube part is pressed toward the second support tube part, and wherein the second support tube part comprises multiple deformation-assisting grooves formed on an area connected to and extending downward from the elastic deformation part, spaced apart from each other at equal intervals, and arranged in a straight line along the longitudinal direction of the first support tube part.

* * * * *